United States Patent Office.

WILLIAM DUGAN, OF CHICAGO, ILLINOIS.

Letters Patent No. 113,505, dated April 11, 1871.

IMPROVEMENT IN PRESERVING AND TRANSPORTING FRESH MEATS.

The Schedule referred to in these Letters Patent and making part of the same.

*To all whom it may concern:*

Be it known that I, WILLIAM DUGAN, of the city of Chicago, in the county of Cook and State of Illinois, have invented a new Process for Curing and Preserving Fresh Meats; and I do hereby declare the following to be a full, clear, and exact description of the same.

It is is well known that the Southwest affords the greatest facilities for raising beef-cattle economically of any portion of the United States, from the fact that the cattle subsist summer and winter by grazing without the care of man. For this reason the Eastern market can be supplied cheaply with such beef; but the difficulty attending its transportation in a fresh condition after being killed, or in a fat, healthy condition upon the hoof, has prevented this source of supply from being available to any great extent.

If the beef is killed before transportation it must be salted or pickled, in order to preserve it, to such an extent as to destroy its freshness and render it unpalatable as fresh beef when it reaches its destination.

Inasmuch, also, as the cattle are permitted to graze unrestrained, they are exceedingly wild and shy, and when penned up refuse to eat or drink, and arrive at the market worn out and feverish, so that when killed the meat is unfit for consumption, and is, moreover, absolutely injurious.

During transportation, also, the cattle are liable to become crippled and bruised and thereby render the meat soft and disagreeable in flavor.

Attempts have been made to transport the meat to Eastern markets in ice; but as the latter must be shipped for the East or North this method of preserving the meat is too expensive to be practicable.

My invention has for its object to so cure and preserve the meat that it can be transported in a comparatively fresh condition without being injured or tainted even in the warmest weather, and so that it can be placed upon the market as fresh meat, being only salted to the extent required for seasoning in cooking; and to this end, My invention consists in the process which I will now proceed to describe in detail.

The beef is slaughtered and hung up in a suitable place from twelve to twenty-four hours. It is then cut up into pieces of the proper size and dipped into a solution composed of the ingredients and in about the proportions as follows: one and a half pounds carbonate of soda, ten pounds saltpeter, one bushel salt, dissolved in a sufficient quantity of water.

After having been dipped into this solution the beef is thrown into a pile with salt, and in a few hours, more or less, is packed in large, cheap packages, or in bulk, as preferred, and shipped to its destination. It should be shipped at furthest twenty-four hours after being slaughtered and packed.

Upon arrival at its destination the beef is placed in an ice-house or packed in ice for twelve or twenty-four hours to remove the heat, and then put up in packages, to suit the trade, with ice-cold pickle. If warm, the beef should be kept in a cool place for a few days; but if not it is immediately shipped or disposed of for consumption.

Cured in this manner the beef will remain perfectly sweet during very warm weather from eight to twelve days, thereby giving ample time for its shipment to any part of the country.

By my invention I avoid the expensive use of ice and also the cost of barrels and cooperage.

I am aware of the patent granted to William Ross, January 1, 1867, in which is claimed a pickle or brine for preserving meats. This, however, I do not claim; but What I do claim is—

The process herein described for the temporary preservation of meats for transportation.

The above specification of my invention signed by me this 18th day of August, 1870.

WILLIAM DUGAN.

Witnesses:
E. A. ELLSWORTH,
N. K. ELLSWORTH.